(12) United States Patent
Hollenbeck

(10) Patent No.: US 7,588,284 B2
(45) Date of Patent: Sep. 15, 2009

(54) CONVERTIBLE

(75) Inventor: Sven Hollenbeck, Westerkappeln (DE)

(73) Assignee: Wilhelm Karmann GmbH, Osnabrück (DE)

( * ) Notice: Subject to any disclaimer, the term of this patent is extended or adjusted under 35 U.S.C. 154(b) by 0 days.

(21) Appl. No.: 10/577,029

(22) PCT Filed: Oct. 12, 2004

(86) PCT No.: PCT/DE2004/002261

§ 371 (c)(1),
(2), (4) Date: Jan. 16, 2007

(87) PCT Pub. No.: WO2005/039910

PCT Pub. Date: May 6, 2005

(65) Prior Publication Data

US 2007/0205630 A1 Sep. 6, 2007

(30) Foreign Application Priority Data

Oct. 25, 2003 (DE) ................................ 103 49 849

(51) Int. Cl.
*B60J 7/12* (2006.01)
*B60J 10/10* (2006.01)
(52) U.S. Cl. .............................. 296/107.12; 296/107.04
(58) Field of Classification Search ............ 296/107.12, 296/107.04, 107.09, 100.15
See application file for complete search history.

(56) References Cited

U.S. PATENT DOCUMENTS

| | | | |
|---|---|---|---|
| 2,482,323 A * | 9/1949 | Cromwell et al. ...... | 296/107.12 |
| 3,075,804 A * | 1/1963 | Geiger et al. .......... | 296/107.12 |
| 4,573,732 A * | 3/1986 | Muscat ................ | 296/108 |
| 5,002,330 A * | 3/1991 | Koppenstein et al. .. | 296/107.12 |
| 5,219,200 A * | 6/1993 | Orth et al. ............ | 296/107.09 |
| 5,918,928 A * | 7/1999 | Kolb et al. ............ | 296/107.04 |
| 5,998,948 A * | 12/1999 | Lange et al. .......... | 318/280 |
| 6,022,064 A * | 2/2000 | Robbins et al. ....... | 296/107.12 |
| 6,325,446 B1* | 12/2001 | Wuellrich et al. ..... | 296/107.12 |
| 6,328,372 B1* | 12/2001 | Just .................... | 296/107.12 |
| 6,491,334 B1* | 12/2002 | Anders ................. | 296/107.04 |
| 6,820,917 B2* | 11/2004 | Grubbs ................ | 296/107.17 |
| 7,517,000 B2* | 4/2009 | Liedmeyer et al. ..... | 296/107.09 |
| 2006/0152034 A1* | 7/2006 | Schonenbach ........ | 296/107.12 |
| 2007/0138827 A1* | 6/2007 | Schonhorst et al. .... | 296/107.02 |

FOREIGN PATENT DOCUMENTS

| | | |
|---|---|---|
| DE | 38 18 616 | 6/1989 |
| DE | 39 14 639 | 11/1990 |
| DE | 41 30 180 | 8/1992 |
| DE | 200 06 258 | 7/2000 |
| JP | 10129274 A * | 5/1998 |

* cited by examiner

*Primary Examiner*—Glenn Dayoan
*Assistant Examiner*—Paul A Chenevert
(74) *Attorney, Agent, or Firm*—Friedrich Kueffner

(57) ABSTRACT

Disclosed is a convertible (1) comprising a movable roof (2) that is provided with a flexible cover (4), at least in the rear area (6) thereof. The rear zone of said flexible cover (4) is retained on a stretching hoop (8) which can be displaced upward from a stretching position forming the closed roof (2). At least one flexible stretching device (13) is assigned to the cover (4) in lower edge areas that are located in front of the stretching loop (8) relative to the direction of travel (F), said flexible stretching device (13) applying a tensioning force to said edge areas when the roof (2) is closed.

10 Claims, 5 Drawing Sheets

CONVERTIBLE

BACKGROUND OF THE INVENTION

1. Field of the Invention

The invention concerns a convertible vehicle with a movable roof, which has a flexible roof covering at least in its rear area.

2. Description of the Related Art

A convertible vehicle with a completely or partially flexible roof covering, e.g., a vinyl or textile roof covering, often has, provided that the rear end region of the roof covering is not secured to the vehicle body, a rear tension bow, by which the roof covering can be stretched on a body section on which it rests when the roof is closed. In this regard, it is well known that the tension bow is U-shaped as viewed from above and has a middle section that extends transversely to the vehicle and lateral legs that extend essentially in the longitudinal direction of the vehicle. To allow mobility, for example, rotatability, of the tension bow for opening the roof, it is necessary for a section of the roof covering located in front of the lateral legs of the tension bow with respect to the direction of vehicle travel to be elastically movable and especially foldable during the opening of the tension bow. Therefore, the lateral legs of the tension bow cannot extend, securely connected to the roof covering, as far as, say, a pivot axis of the tension bow, but rather must leave an open section for the movement of the section of the roof covering. Nevertheless, when the roof is closed, this section of the roof covering must rest securely and with a good seal on the automobile body.

SUMMARY OF THE INVENTION

The objective of the invention is to improve a convertible vehicle of the aforementioned type with respect to the sealing contact of lateral sections of a flexible roof covering.

The invention achieves this objective with a convertible vehicle with the features of Claim 1. Advantageous refinements of the object of the invention are described in dependent Claims 2 to 10.

In this regard, a tensioning device that passes over both sides of the vehicle can be provided, which, e.g., passes through the tension bow, or, in a simple design, exactly one tensioning device can be assigned to each longitudinal side of the vehicle.

If the tensioning device(s) each follow a sealing line that lies in the lower marginal region of the roof, and in the tensioning position they act on this sealing line with a force that presses against a region of the automobile body that serves as a support, then improvement of the contact of the entire sealing line can be achieved along a line and not just pointwise.

Additional improvement of the seal is obtained if the support is curved convexly upward.

In this regard, it is advantageous with respect to improvement of the linear contact for the tensioning device(s) to lie at least partially within sealing lines formed by elastic profiles.

In an especially advantageous design of the invention, the flexible tensioning device or each flexible tensioning device has the dual function of applying not only downward pressure on a region laid out on the automobile body but also a tensile force on lateral roof regions in such a way that their tensioning with respect to side windows is improved by reduction of the material slack.

In a simple design of a flexible tensioning device, the device consists of a traction cable with a spring element. To ensure the aforementioned dual function, the traction cable can extend, e.g., over a large region of the sideline of the roof from a roof tip to a rear tension bow.

Further advantages and features of the invention are explained below with reference to the specific embodiment of the object of the invention that is illustrated in the drawings.

DETAILED DESCRIPTION OF THE INVENTION

Figure 1:
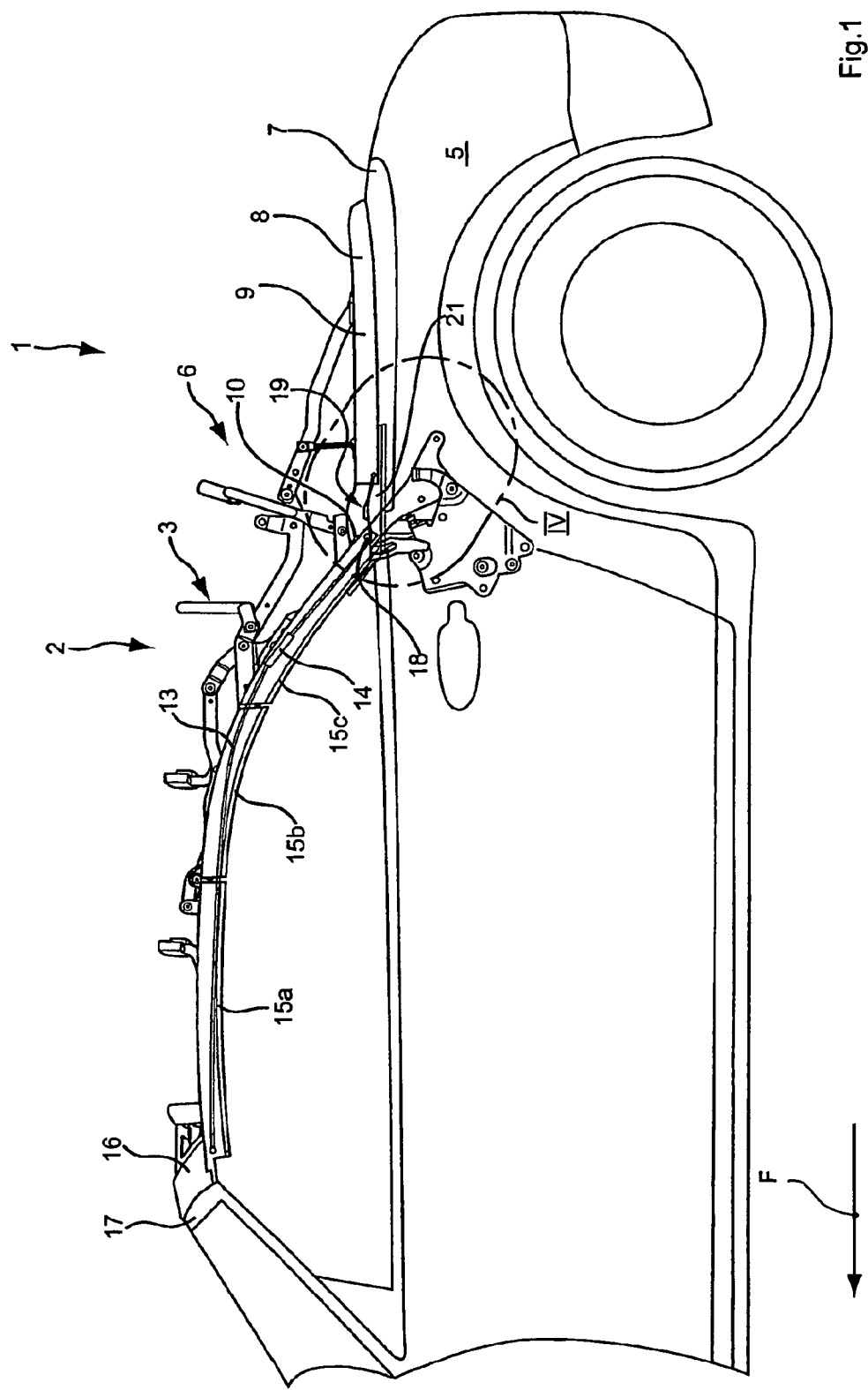
FIG. 1 shows a schematic side view of an upper region of a convertible vehicle of the invention with the roof closed, shown without the roof covering for the sake of clarity.

The convertible vehicle 1, only the upper region of which is shown schematically in FIG. 1, has a movable roof 2, which has a movable linkage that is labeled here as a whole with reference number 3. The movable linkage 3 is completely covered by a roof covering 4 (not shown in FIG. 1). Alternatively, it is also possible to provide a flexible roof covering only in the rear section of the roof 2, and for the front section of the roof 2 with respect to the direction of vehicle travel F to have one or more rigid outer skin sections. The roof 2 can be opened by lowering it as a whole into the automobile body 5.

In the illustrated embodiment, in the closed state of the roof 2, the rear section 6 of the roof 2 rests on an openable cover part 7.

In this region 6, the roof linkage 3 includes a rear tension bow 8, which is horizontally situated when the roof 2 is closed, and in this position rests on the cover part 7. The roof covering 4 is connected to the tension bow 8. The tension bow 8 is U-shaped as viewed from above and comprises a middle section that extends transversely to the vehicle 1 and lateral legs 9 that extend essentially in the direction of vehicle travel F. The tension bow 8 can be swung upward about a fixed horizontal axis 10 or, as illustrated here, about a horizontal axis 10 that can move with a rear lateral frame part 15c out of the tensioned position illustrated in FIG. 1, in which the roof covering 4 is tensioned by the lowered tension bow 8, into a position in which the tension on the roof covering 4 is released.

Figure 2:
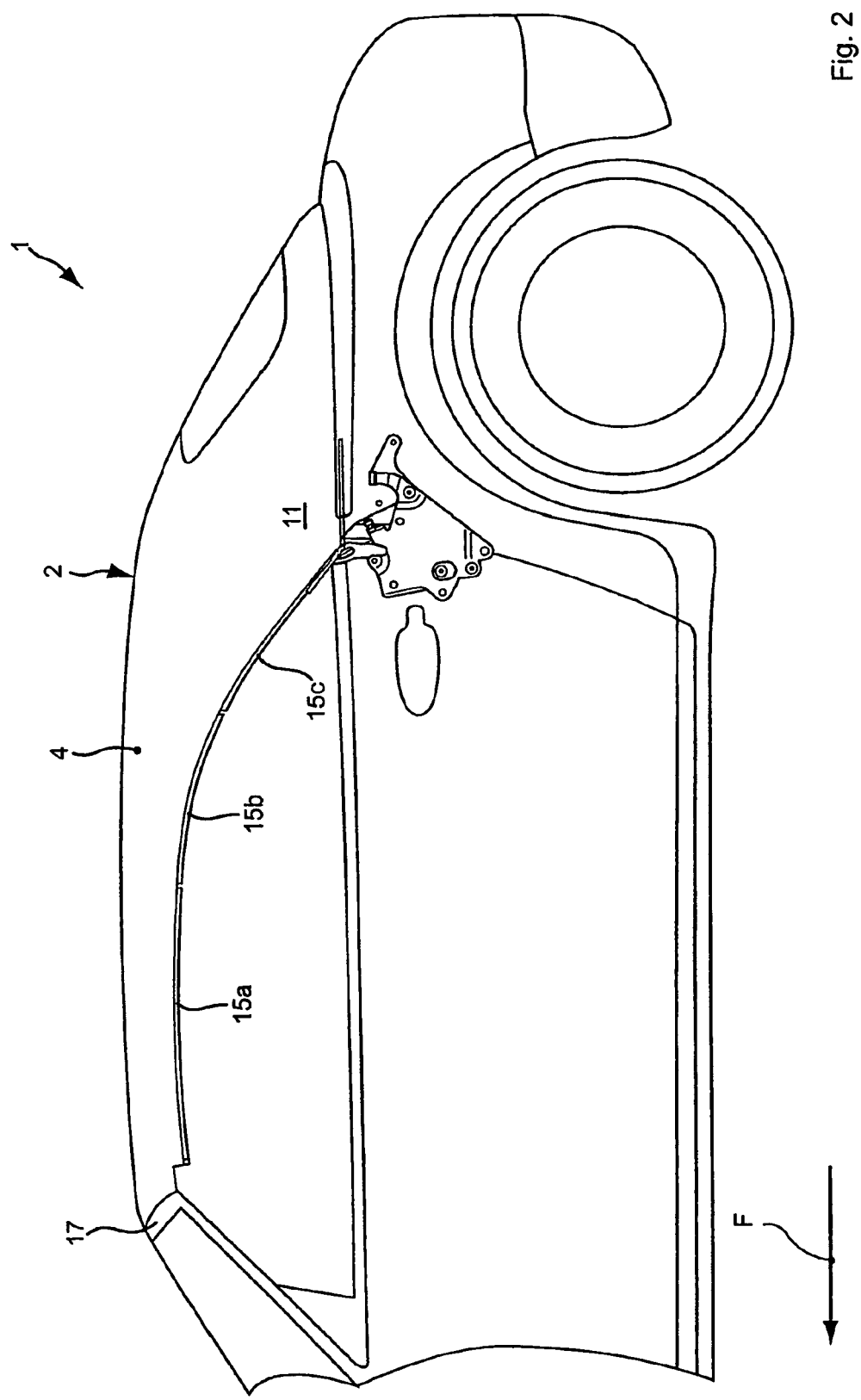
FIG. 2 shows a view similar to that of FIG. 1 but with the roof covering shown.

In front of the lateral legs 9 with respect to the direction of vehicle travel F, there is a region 11 of the roof covering 4, the lower edge of which forms a sealing line 12 that extends each lateral leg 9 towards the front with respect to the direction of vehicle travel F, e.g., by means of a rubber elastic hollow section. When the roof is closed (FIG. 1, FIG. 2), this is intended to produce tight contact between the roof covering 4 and the section of the automobile body 5 on which it rests, for example, the cover part 7. The region 11 that extends freely at its lower edge without support by the tension bow can be a few centimeters to a few tens of centimeters long and can be elastically deformed and folded in to a greater or lesser extent to open the roof 2.

In accordance with the invention, at least one flexible tensioning device 13 is provided to ensure and improve the contact of the sealing line 12 on the automobile body 5 when the roof 2 is closed. Exactly one tensioning device 13 is constructed here on each longitudinal side of the vehicle. Each tensioning device 13 comprises at least one steel cable with a tension spring 14, which, in the present case, is placed between two sections of the steel cable 13 but could also be located at an articulation of the cable 13. The rear end of the cable 13 with respect to the direction of vehicle travel F is articulated with the lateral leg 9 of the tension bow 8, and the front end of the cable 13 is articulated with a front lateral frame part 15a, which is rigidly connected with the roof tip 16. In the closed position of the roof 2, the roof tip 16 (FIG. 1) is locked on a front windshield frame 17.

In this position, the tensioning device 13 experiences its maximum tensile load, so that the section 19 of the tensioning device 13 that is located in the region 11 of the roof covering and that runs essentially horizontally due to the deflection 18 tries to run in a line that is as straight as possible. As a result, the tensioning device 13 exerts a force that acts in the direction of arrow 20 on the sealing line 12 and presses the sealing line 12 into a position in which it is tightly stretched on the automobile body 5. In particular, this action can be supported by providing a support 21 of the automobile body 5 that projects slightly convexly upward. This support 21 also assists the flexure of the steel cable 13 in the direction of arrow 22 when the roof tip 16 is raised.

As a result of the fact that each tensioning device 13 extends between the front lateral frame part 15a and the tension bow 8, the tensioning device 13 is able to carry out its dual function of not only acting on the roof covering 4 in region 11 but also of tightening a region of material slack located farther forward on the lateral frame parts 15a, 15b, 15c relative to side windows of the vehicle 1 and is thus able to improve the seal in this area, too, and to minimize wind noise.

Figure 3:
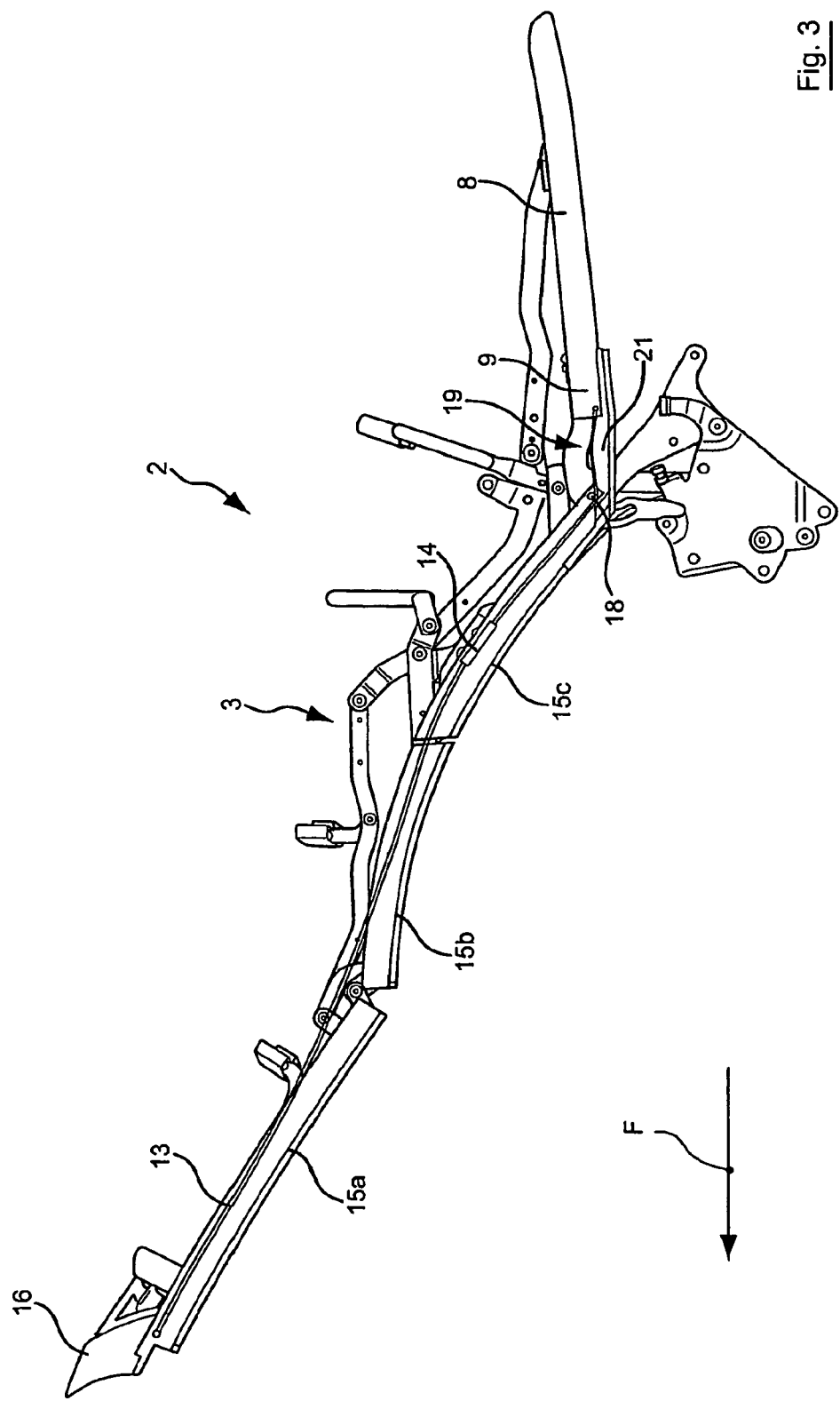
FIG. 3 shows the roof according to FIG. 1 without the roof covering, with the roof tip raised, with the rear tension bow swung slightly upward, and with the flexible tensioning device relaxed.

At the same time, this course of the tensioning device 13 also ensures that when the roof tip 16 is raised, the tensioning device 13 is immediately relaxed to enable the region 11 to fold in (FIG. 3).

Figure 4:
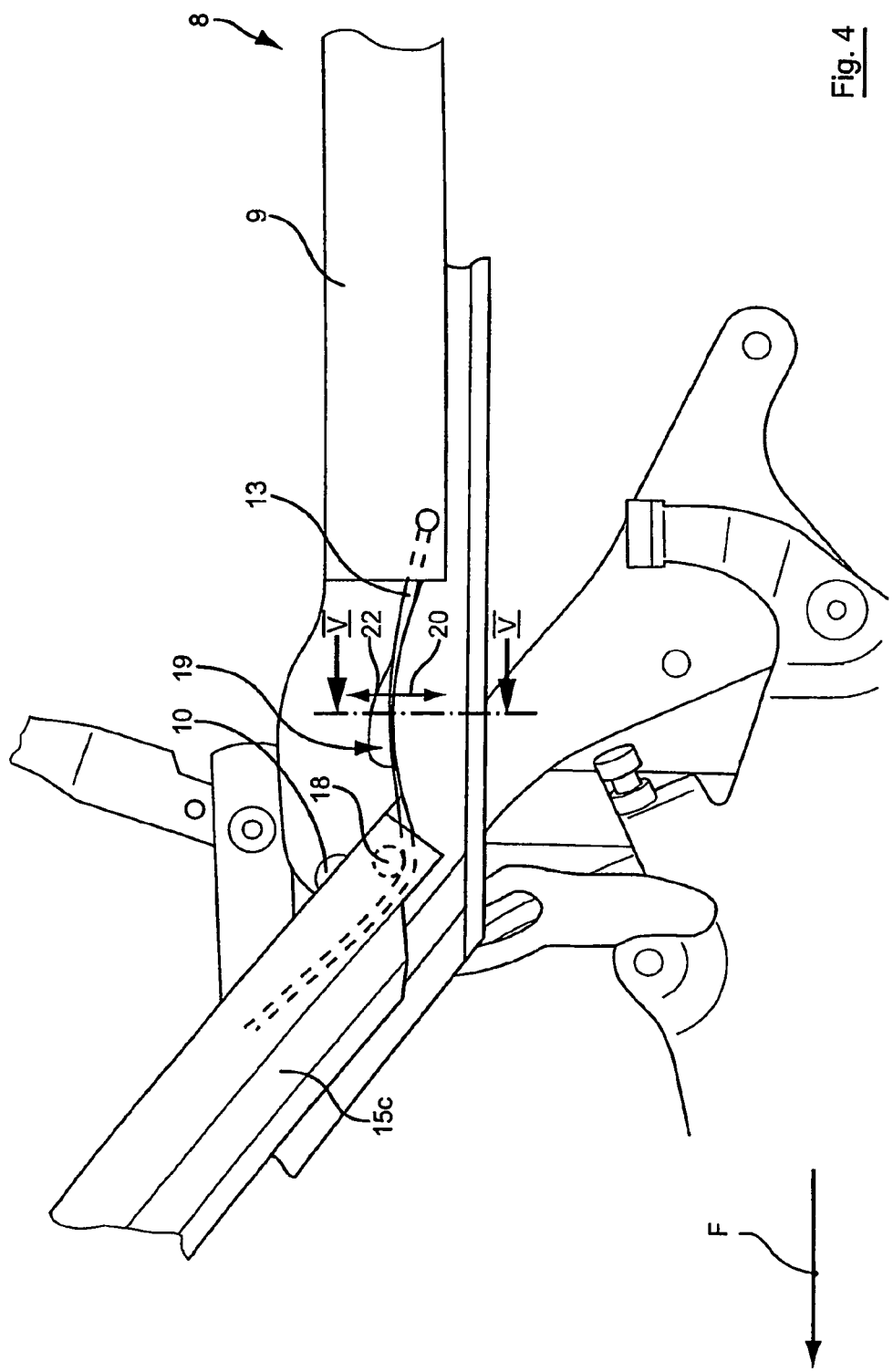
FIG. 4 shows the detail IV in FIG. 1.

FIG. 4 shows detail of the course of section 19 of the traction cable 13 immediately in front of the lateral legs 9 of the tension bow 8. The cable 13 is tightened by tensile force when the roof tip is closed, and at the same time, it presses the seal 12 (not shown in FIG. 4) downward in the direction of arrow 20. Conversely, when the roof tip is released (FIG. 3), the release of the tension allows the cable 13 to bend in the direction of arrow 22, so that the tension bow 8 can swing upward, and the cover part located beneath it obtains sufficient clearance for it to be opened. The roof 2 can then be lowered into the automobile body.

Figure 5:
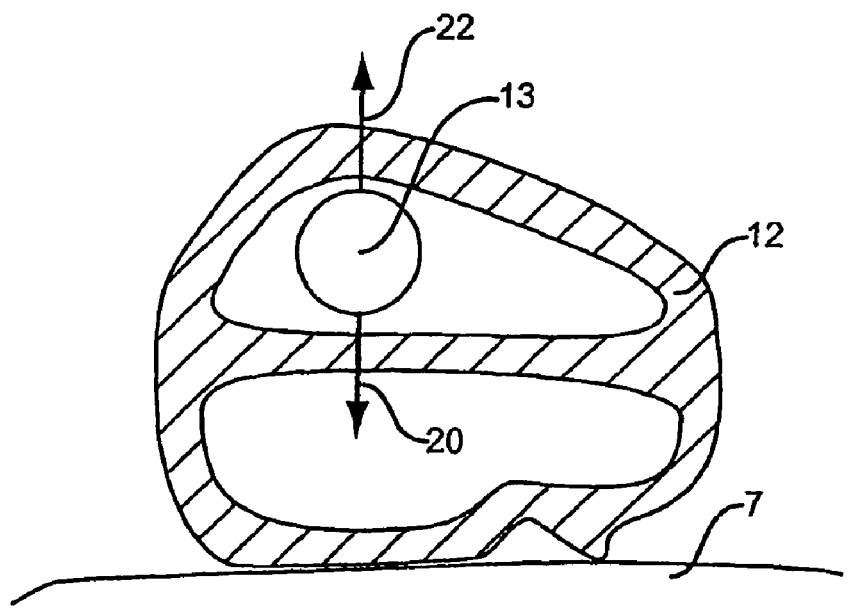
FIG. 5 shows a section along line V-V in FIG. 4 with a weatherstrip additionally shown.
Figure 6:
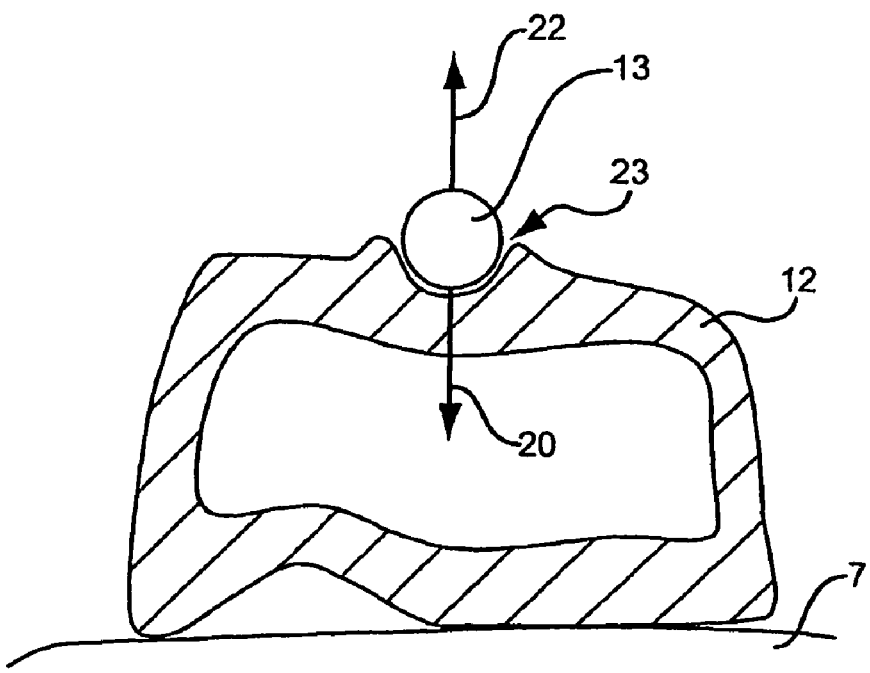
FIG. 6 shows a view, similar to that of FIG. 5, of an alternatively arranged traction cable laid above the sealing profile.

The manner in which the flexible traction cable 13 is laid (FIG. 5) results in an arrangement of the steel cable 13 that provides protection against external wear. The linear application of pressure on the seal 12 can be especially well ensured.

The cable 13 can also be laid above the seal 12, e.g., in a holding groove 23 formed in the seal. This facilitates the laying of the tensioning device 13.

Instead of a traction cable, other flexible and elastically deformable elements can be provided for the tensioning device 13, e.g., a leaf spring or other type of spring. It is also possible that the movement of the tensioning device could require an additional drive element, and that the tensioning device is not automatically tightened and released, as in the present case, by the movement of the roof.

The invention claimed is:

1. Convertible vehicle (1) with an automobile body and a movable roof (2), which has a flexible roof covering (4) at least in the rear area thereof, wherein the rear of the roof covering (4) is held on a tension bow (11), which can be moved upward from a tensioned position that forms the closed roof (2), wherein at least one flexible tensioning device (13) is assigned to the roof covering (4) and exerts a tensioning force on marginal regions of the roof covering (4) when the roof (2) is closed, wherein the at least one flexible tensioning device (13) comprising a traction cable is assigned to a sealing line (12) of the roof covering (4) in a lower marginal region of the roof and in a marginal region of the roof that is located in front of the tension bow (8) with respect to the direction of vehicle travel (F), and in the tensioning position with the roof (2) closed, wherein the sealing line (12) is comprised of a rubber elastic hollow section, and the at least one flexible tensioning device on the sealing line with a force that presses downward, wherein, in closed position of the roof, a section of the traction cable extends horizontally so that the sealing line is pressed into a position where the sealing line is tightly stretched on the automobile body.

2. Convertible vehicle in accordance with claim 1, wherein exactly one tensioning device (13) is assigned to each longitudinal side of the vehicle.

3. Convertible vehicle in accordance with claim 1, wherein the at least one flexible tensioning device (13) each act on the sealing line (12) with a force that presses against a region (21) of the automobile body (5) that serves as a support.

4. Convertible vehicle in accordance with claim 3, wherein the support (21) is curved convexly upward.

5. Convertible vehicle in accordance with claim 1, wherein the at least one flexible tensioning device (13) lies at least partially within sealing lines (12) formed by elastic profiles.

6. Convertible vehicle in accordance with claim 1, wherein each flexible tensioning device (13) has a dual function, when the roof (2) is closed, of applying both a force that presses the marginal region (11) in front of the tension bow (8) downward and a force that tightens lateral seals located farther to the front with respect to the direction of vehicle travel (F) against upper edges of side windows.

7. Convertible vehicle in accordance with claim 1, wherein a tensioning device (13) extends between a front roof region and the rear tension bow (8).

8. Convertible vehicle in accordance with claim 1, wherein each tensioning device (13) includes a tension spring (14).

9. Convertible vehicle in accordance with claim 1, wherein each tensioning device (13) includes a traction cable.

10. Convertible vehicle in accordance with claim 1, further comprises a body-mounted cover part (7), on which, in the closed position, the rear end (6) of the roof tightly rests, and which is to be opened to receive the roof (2) in the automobile body (5).

* * * * *